United States Patent [19]

Cozzi

[11] 4,414,921
[45] Nov. 15, 1983

[54] TRAINING AID BELL FOR PETS

[76] Inventor: Joseph A. Cozzi, 212 Washington Ave., Little Ferry, N.J. 07643

[21] Appl. No.: 325,003

[22] Filed: Nov. 25, 1981

[51] Int. Cl.³ .................................................. A01K 15/00
[52] U.S. Cl. ......................................................... 119/29
[58] Field of Search .................. 119/29, 29.5; 46/174, 46/175 R, 193, 189

[56] References Cited

U.S. PATENT DOCUMENTS

| | | | |
|---|---|---|---|
| 2,296,000 | 9/1942 | Ojalvo | 119/29 |
| 2,303,223 | 11/1942 | Murry et al. | 46/193 |
| 2,833,244 | 5/1958 | Bohlman | 119/29 |
| 3,315,640 | 4/1967 | Gamble | 119/29 |
| 3,459,158 | 8/1969 | Mitchell | 119/29 |
| 3,916,838 | 11/1975 | Swart | 119/29 |

*Primary Examiner*—Gene Mancene
*Assistant Examiner*—Kris R. Schulze
*Attorney, Agent, or Firm*—Samuelson & Jacob

[57] ABSTRACT

A training aid for use in effectively training dogs, cats and other pets includes a housing mounted to a suitable surface, and a spring plate hinged to the housing such that the spring plate is selectively placed by the pet trainer in a position projecting from the housing so as to be movable by the pet or the trainer to cause an attached bell to sound, the spring plate also having an attached pull-ring for assisting the pet in sounding the bell when it has a need or desire for a particular activity, a raised retaining lip for retaining treats, a combination spring clip and cleat for holding a folded pet leash, and a writing insert received within the housing and having a display viewable by the trainer or another person when the spring plate is in the projecting position for displaying the particular activity signified by the sounding of the bell.

17 Claims, 6 Drawing Figures

U.S. Patent  Nov. 15, 1983  4,414,921
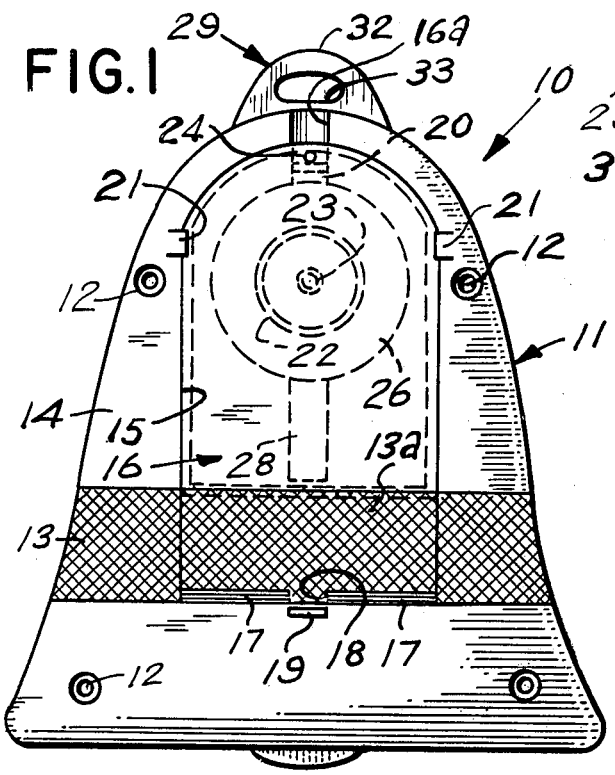
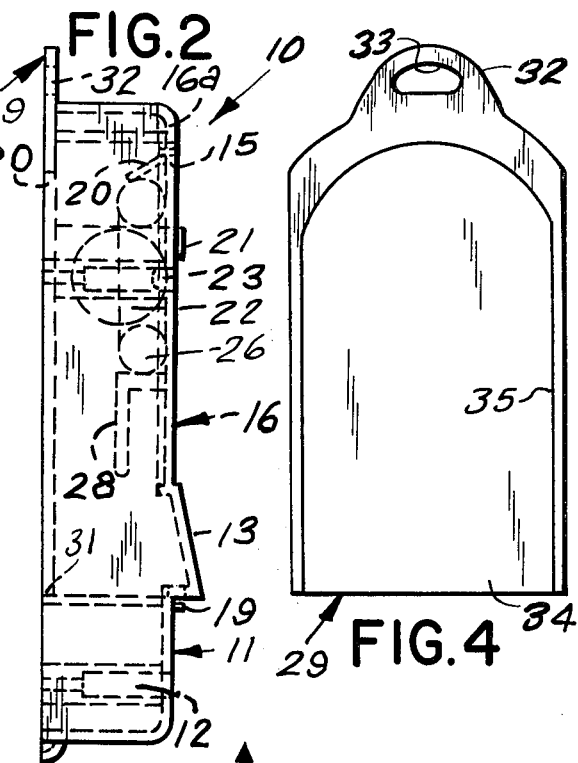
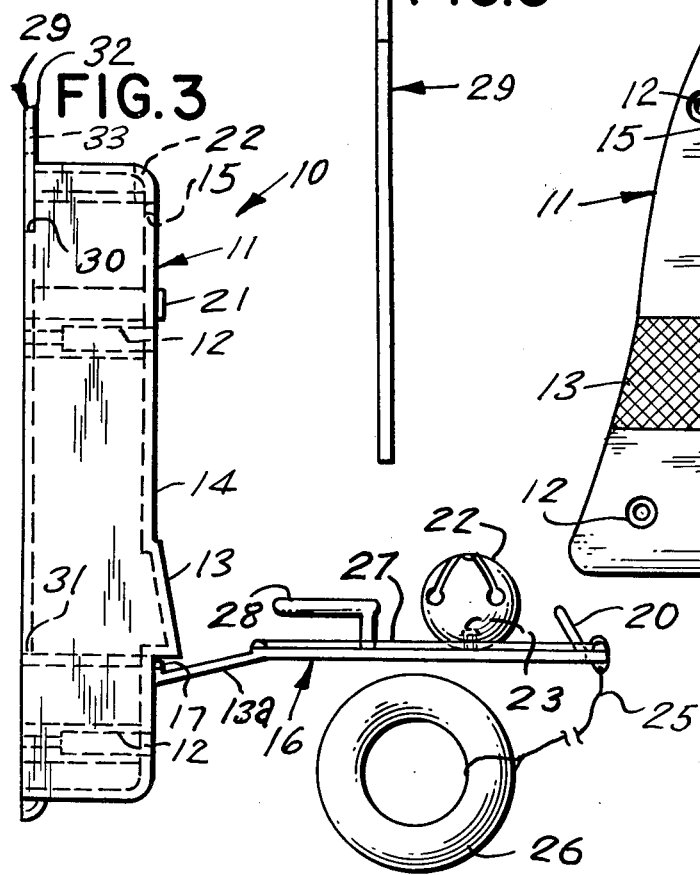
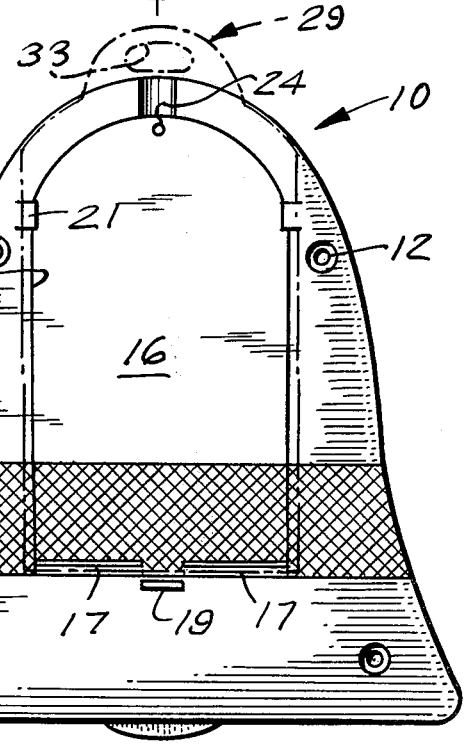

TRAINING AID BELL FOR PETS

This invention relates to training aids for pets, and more particularly, to a training aid for pets which utilizes a sounding device operated by a pet to communicate a need or desire for a particular activity on the part of the pet.

The principal object of this invention is to provide a sounding training aid for pets, which will be unique and novel.

Another object of this invention is to provide a sounding training aid for pets, which will constitute a means for communication between the pet and its owner.

Another object of this invention is to provide a sounding training aid device for pets, which will be of such structure, as to be operated by the pet or its owner, and the device also serves as a game, in which both the owner and the pet can participate.

A further object of this invention is to provide a sounding training aid for pets, so that when the dog, cat, or other pet is trained by such means, the animal will be able to communicate its present desires or needs to the owner.

A still further object of this invention is to provide a sounding training aid for pets, which may be employed in various household locations for each application thereof, and will be safe in use.

Other objects of the present invention are to provide a sounding training aid for pets, which is simple in design, inexpensive to manufacture, rugged in construction, easy to use and efficient in operation.

These, and other objects, will be readily evident, upon a study of the following specification, and the accompanying drawing, wherein:

FIG. 1 is a front elevational view of a training aid constructed in accordance with the present invention, shown in its closed position;

FIG. 2 is a left side view of the training aid, shown closed;

FIG. 3 is similar to FIG. 2, but illustrates the device in open position;

FIG. 4 is a front elevational view of a writing insert which is a component part of the training aid and is shown removed from the housing of the device;

FIG. 5 is a side view of the writing insert, and

FIG. 6 is similar to FIG . 1, but shows the writing insert in phantom lines and in place in the housing.

According to this invention, a training aid 10 is shown to include a housing 11, having a plurality of spaced-apart mounting openings 12 for receiving suitable fasteners to mount training aid 10 to a desired surface. A portion 13 of the front surface 14 of housing 11 is serrated and raised for decorative purposes. An opening 15 is surface 14 hingeably receives an actuator in the form of a spring plate 16, which also includes a serrated outer surface 13a, which aligns with surface 13 of housing 11. A pair of hinges 17 are suitably secured to the bottom of spring plate 16 and housing 11, so as to enable plate 16 to pivot upward and downward, between an upward, deactivated position, illustrated in FIGS 1 and 2, and a downward, activated position, illustrated in FIG. 3, and the opening 18 between hinges 17 receives a projecting lip 19, which is fixedly secured to the face 14 of housing 11 by suitable means. A spring catch 20 is fixedly secured to the top of spring plate 16, so as to engage with and selectively hold plate 16 in its upward closed or deactivated position in the opening 15, in conjunction with a pair of oppositely opposed latch fingers 21, which are fixedly secured to the surface 14 of housing 11 in a suitable manner. A sounding means in the form of a common spherical bell 22 is fixedly secured to the top of spring plate 16 by a suitable fastener 23, so as to sound when plate 16, which serves as an actuator for bell 22, is moved by a pet or by the pet trainer or another person, which hereinafter will be described. An opening 16a in the top of housing 11 provides a means for the person's finger to enter, so as to disengage selectively the upper end of plate 16, to enable plate 16 to pivot downwards ninety degrees, where it is held by the lip 19, which serves as stop means against 13a of plate 16, so that the plate 16 is accessible for movement by the pet or the person to actuate the bell 22. Thus, the ability to pivot the plate 16 between the activated and deactivated positions serves as a means for selectively activating the actuator provided by plate 16 by pivoting the plate to the activated position, and deactivating the actuator by holding the plate 16 in the deactivated position.

An opening 24 through the end of spring plate 16 provides a means of tying a cord 25 at one end, and the other end of cord 25 is secured to a pull-ring 26 of plastic or rubber material, which may be grasped by the pet, so as to make spring plate 16 vibrate and cause bell 22 to sound. The bell 22 will also sound when the pet hits the spring plate 16 with its paw or nose, and a raised lip 27 extends upwards and is integral with to the spring plate 16 for retaining a pet treat within its confines. A spring clip and cleat combination 28 is secured in a suitable manner to the top of spring plate 16, so as to retain a folded leash for the pet, if desired, or it may be used to retain a ball or other toy to relate the bell 22 with play.

A plastic writing insert 29 of substantially rectangular configuration is slideably received within the side edges 30 of an opening 31 in the rear of housing 11, and insert 29 includes a pull-tab 32 at its upper end, having an opening 33 therethrough for easy finger grip removal and insertion into housing 11. The surface 34 defined within border 35 of insert 29 provides a display area which enables a person to write thereon with a felt tip marking pen, and the writing may be easily erased by a damp cloth when desired. When the insert 29 is placed in the housing 11, the display area is viewable through opening 15, when the spring plate 16 is in its lower, activated position. The insert is used to add a little humor with different displays which identify and indicate to everyone in the household the particular activity for which the pet is being trained, some of which activities are as follows:

(a) Take Me Out
(b) Feed Me
(c) Lets Go For A Walk
(d) Give Me Water
(e) Lets Play Ball In use, training aid 10 is secured to a suitable wall or other structure by common fasteners, and a separate training aid 10 is installed in different locations for each application. In order to place training aid 10 into use, the spring plate 16 is activated by being pulled downwards to its stop lip 19, by the trainer or other person selectively pulling the top of plate 16 with his finger, which will release the side edges of plate 16 from the latch projections 21. In training a pet, for example, the owner or trainer taps the spring plate 16, which will vibrate and cause bell 22 to sound prior to taking the pet out, feeding the pet or performing any of the activities connected with the enumerated displays.

By placing treats of food or the pet leash on spring plate 16, under the spring clip and cleat combination 28, it will help accelerate the training of the animal.

The pet, after a short period of time, will sound the bell 22, either by pulling on the pull-ring 26, or by hitting the spring plate 16 with its nose or paw, and once trained, the pet will automatically convey its desires and needs to the owner or others who are familar with its training.

It shall be noted, that training aid 10 is a novelty which relates the sounding of a device, such as a bell 22, with a written display on the insert 29, and to that extent, serves as a means of communication between the pet and a person who views the display.

When it is desired to discontinue use of the training aid 10, the spring plate 16 is moved to the upper, deactivated position where the spring plate 16 is inaccessible for movement by the pet. At the same time, the display area of insert 29 is placed behind the spring plate 16 and out of view.

It shall also be recognized, that the training aids can be fabricated in different colors, since a bright color contrast will help some pets, for more than one application.

Research also indicates that most pets see in shades of grey, and a sharp color contrast will be of assistance where multiple aids are used for more than one application. Example: There might be a white training aid in the kitchen for requesting food or water, and a dark brown training aid located by the door, to indicate going out or going for a walk.

While various changes may be made in the detail construction, it is understood that such changes will be made within the spirit and scope of the present invention, as is defined by the appended claims.

What is claimed as new is:

1. A training aid for use in connection with training a pet and subsequently enabling the pet to communicate a particular desired activity to a person, the training aid comprising:
    a stationary housing;
    a sounding device on the housing;
    an actuator mounted on the housing for movement relative to the housing and coupled to the sounding device for sounding of the sounding device in response to movement of the actuator relative to the housing by either one of the pet and the person; and
    a display member located on the housing in stationary relationship therewith and including a display area placed in view of the person for identifying and displaying the particular activity signified by the sounding of the sounding device.

2. The invention of claim 1 wherein the actuator includes a spring plate for projecting from the housing in a position accessible to the pet.

3. The invention of claim 2 wherein the sounding means includes a bell attached to the spring plate for sounding in response to vibratory movement of the spring plate.

4. The invention of claim 3 including a pull-ring attached to the spring plate for facilitating vibratory movement of the spring plate by the pet.

5. The invention of claim 1 including activating means on the housing for operation by the person to selectively activate and deactivate the actuator.

6. The invention of claim 5 wherein:
    the actuator includes a spring plate for projecting from the housing in a position accessible to the pet; and
    the activating means includes mounting means for mounting the spring plate upon the housing for movement between an activated position wherein the spring plate projects from the housing in the position accessible for movement by the pet, and a deactivated position wherein the spring plate is located relative to the housing in a position inaccessible for movement by the pet, and retaining means for selectively retaining the spring plate in the deactivated position.

7. The invention of claim 6 wherein the sounding means includes a bell attached to the spring plate for sounding in response to vibratory movement of the spring plate.

8. The invention of claim 7 including a pull-ring attached to the spring plate for facilitating vibratory movement of the spring plate by the pet.

9. The invention of claim 6 including treat-retaining means on the spring plate for retaining a pet treat upon the spring plate and placed such that the pet treat is exposed and accessible to the pet when the spring plate is in the activated position, and is enclosed within the housing and inaccessible to the pet when the spring plate is in the deactivated position.

10. The invention of claim 9 wherein the sounding means includes a bell attached to the spring plate for sounding in response to vibratory movement of the spring plate.

11. The invention of claim 1 wherein the display member is selectively removable from the housing and includes a display area for receiving a selected written display corresponding to the particular activity signified by the sounding of the sounding device.

12. The invention of claim 11 including activating means on the housing for operation by the person to selectively activate and deactivate the actuator, and wherein:
    the actuator includes a spring plate for projecting from the housing in a position accessible to the pet; and
    the activating means including mounting means for mounting the spring plate upon the housing for movement between an activated position wherein the spring plate projects from the housing in the position accessible for movement by the pet, and a deactivated position wherein the spring plate is located relative to the housing in a position inaccessible for movement by the pet, and retaining means for selectively retaining the spring plate in the deactivated position;
    the display area of the display member being placed in the housing and relative to the spring plate so as to be out of view of the person when the spring plate is in the deactivated position.

13. The invention of claim 12 wherein the sounding means includes a bell attached to the spring plate for sounding in response to vibratory movement of the spring plate.

14. The invention of claim 13 including a pull-ring attached to the spring plate for facilitating vibratory movement of the spring plate by the pet.

15. The invention of claim 14 including treat-retaining means on the spring plate for retaining a pet treat upon the spring plate and placed such that the pet treat is exposed and accessible to the pet when the spring plate is in the activated position, and is enclosed within the housing and inaccessible to the pet when the spring plate is in the deactivated position.

16. The invention of claim 15 wherein the sounding means includes a bell attached to the spring plate for sounding in response to vibratory movement of the spring plate.

17. The invention of claim 16 including pull-ring attached to the spring plate for facilitating vibratory movement of the spring plate by the pet.

* * * * *